United States Patent [19]

Bedard

[11] 4,169,657
[45] Oct. 2, 1979

[54] LAMINATED STRENGTH MEMBERS FOR FIBER OPTIC CABLE

[75] Inventor: Kenneth L. Bedard, Willimantic, Conn.

[73] Assignee: Akzona Incorporated, Asheville, N.C.

[21] Appl. No.: 882,832

[22] Filed: Mar. 2, 1978

[51] Int. Cl.² ............................................. G02B 5/14
[52] U.S. Cl. ..................................... 350/96.23; 264/1; 264/229
[58] Field of Search ............... 350/96.23, 96.24, 96.25, 350/96.26; 174/70 R, 124 R; 264/1, 229; 427/162

[56] References Cited

U.S. PATENT DOCUMENTS

| | | | |
|---|---|---|---|
| 3,691,001 | 9/1972 | Takahashi et al. | 350/96.26 X |
| 3,813,098 | 5/1974 | Fischer et al. | 350/96.23 UX |
| 3,855,897 | 12/1974 | Takahashi et al. | 350/96.26 X |
| 3,883,218 | 5/1975 | Slaughter | 350/96.23 |
| 4,009,932 | 3/1977 | Ferrentino | 350/96.29 |
| 4,093,342 | 6/1978 | Foord et al. | 350/96.23 |
| 4,113,349 | 9/1978 | Stiles | 350/96.23 |
| 4,138,193 | 2/1979 | Olszewski et al. | 350/96.23 |

FOREIGN PATENT DOCUMENTS

| | | | |
|---|---|---|---|
| 2296192 | 7/1976 | France | 350/96.23 |
| 2319912 | 2/1977 | France | 350/96.23 |
| 1486227 | 9/1977 | United Kingdom | 350/96.23 |

*Primary Examiner*—John K. Corbin
*Assistant Examiner*—John D. Lee
*Attorney, Agent, or Firm*—Francis W. Young; David M. Carter

[57] ABSTRACT

A fiber optic cable having a plurality of pre-stretched strength members associated therewith. The strength members are maintained in a pre-stretched condition by adhering the strength members to at least one laminant after stretching. The strength members are pre-stretched by a stretching force equal to or greater than the predetermined longitudinal break strength for associated optical fibers. The laminate holding the strength members is placed in a direction parallel to the fiber optic core and substantially surrounding the core. Thus, the strength members will provide a force on the termination opposite the longitudinal stress forces placed on the fiber optic core.

12 Claims, 4 Drawing Figures

LAMINATED STRENGTH MEMBERS FOR FIBER OPTIC CABLE

BACKGROUND OF THE INVENTION

This invention relates to an improved fiber optic cable. More particularly, it relates to the use of pre-stretched strength members parallel to optical fibers for providing a force equal to or greater than the predetermined break strength of an optical fiber.

With the realization of the limited number of communication channels available in metal conductor electrical communication cable, the use of optical fibers with modulated light sources for communication is fast becoming a reality. An optical fiber provides at least one order of magnitude more channels per tranmission path than a metal conductor.

One of the major problems in the use of optical fibers is that they are normally made of glass and thus are easily broken. One type of breakage occurs when the cable, and thus optical fiber, is placed under a longitudinal load, causing longitudinal stress and strain on the fiber. Several means have been devised to overcome this problem of longitudinal stress. U.S. Pat. No. 3,855,897 shows a plurality of optical fibers arranged in a helical fashion about the core of the cable. During longitudinal stress, the pitch in each helical turn will lose amplitude to absorb the stress on the fibers rather than the fibers themselves.

U.S. Pat. No. 3,883,218 also discloses the use of a helical wound fiber bundle which also takes up stress during longitudinal load on the cable. Furthermore, this patent discloses a reinforcing member inserted in the center of the fiber bundle for providing strength to the cable as well as overcoming certain stress problems.

The use of helical fibers pose severe manufacturing problems as well as impaired light transmission.

U.S. Pat. No. 4,009,932 discloses the use of strength members parallel to the optical fiber in a optical cable core. The strength members are made of metal wires which have a much higher break strength than the fiber. The use of these metal strength members increases the cost of the resulting cable. Furthermore, the metal wire acts as an antenna which could cause electrical interference with the electronics at both ends of the cable.

While all of these above patents disclose means of protecting optical fibers from longitudinal stress, there is a need to provide a simple and relatively inexpensive means of protecting optical fibers.

OBJECT OF THE INVENTION

It is therefore one object of this invention to provide a fiber optic cable having an improved means for protecting optical fibers from longitudinal stress.

It is another object to provide an inexpensive and relatively simple method of manufacturing a fiber optic cable having protection from longitudinal stress.

SUMMARY OF THE INVENTION

There is provided a fiber optic cable having a fiber optic core. At least one pre-stretched elastic strength member is provided parallel to the fiber optic core. The pre-stretched strength member is kept in its pre-stretched condition by adherence to at least one laminant which substantially circumscribes the fiber optic core. As a result of this stretching, the strength member provides a force in the opposite direction to longitudinal load stress that may be placed on the fiber optic core.

In accordance with another form of this invention there is provided a method for making an improved fiber optic cable. The method comprises pre-stretching at least one strength member; adhereing the strength member to a laminant; holding the pre-stretched strength member in its elongated position; wrapping the laminant about the fiber optic core.

BRIEF DESCRIPTION OF THE DRAWINGS

The subject matter which is regarded as the invention is set forth in the appended claims. The invention, however, together with further objects and advantages thereof may be better understood with reference to the following description taken in conjunction with the accompanying drawings in which:

DESCRIPTION OF THE PREFERRED EMBODIMENT

Figure 1:
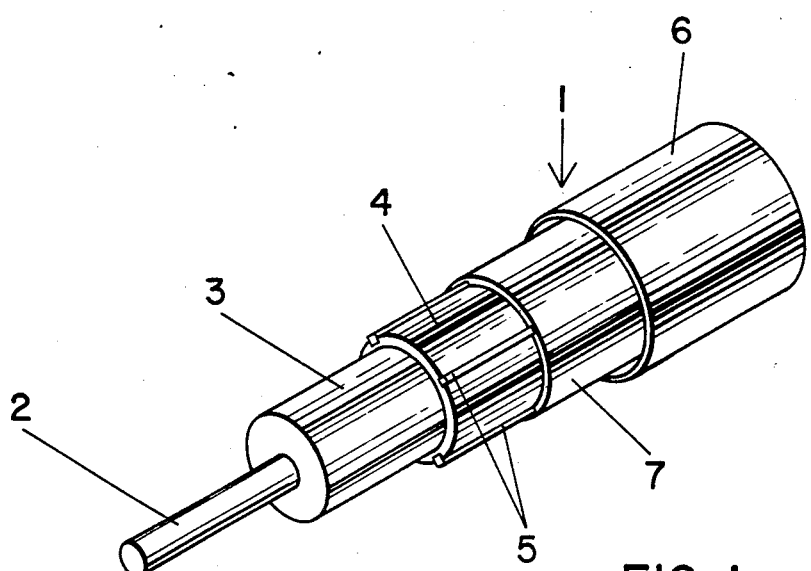
FIG. 1 is a partial isometric view with portions removed, of a fiber optic cable having pre-stretched strength members in accordance with one form of this invention.
Figure 3:
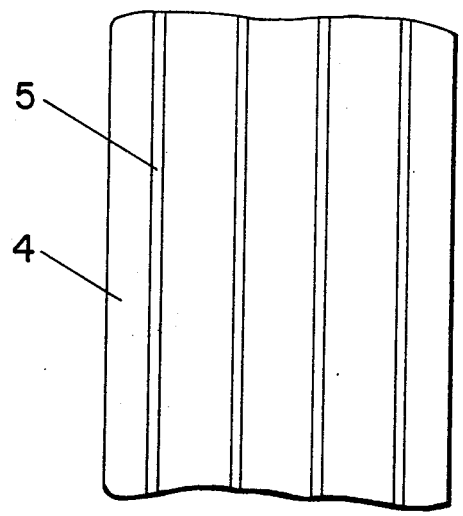
FIG. 3 is a partial top view of the laminated pre-stretched strength members showing further aspects of this invention.

Referring now more particularly to FIG. 1, there is provided fiber optic cable 1 shown with its structure partially removed in a staggered manner from the inner fiber to the outer jacket. Optical fiber 2 in this embodiment is made of a glass material. A suitable glass optical fiber may be obtained from the Corning Glass Works or from other commercial sources. Optical fiber 2 may be replaced by a bundle of optical fibers without departing from the spirit of the invention.

In this embodiment, optical fiber 2 is covered by a material 3 which protects the optical fiber from abrasion and also from external forces in the perpendicular direction to the horizontal axis of fiber 2. Protection member 3 may be made from many materials such as plastics including polyvinlychloride. The protection member may be extruded over the optical fiber.

Sheath 6 may be extruded over the top of the core 7, also providing protection for the core. This sheath may be made from a synthetic resin such as polyurethane. Laminant 4 acts as a carrier for a plurality of optical strength members 5 and may be made of various materials such as polyester. The strength members may be made of various elastic materials such as Kevlar, nylon or polyester. Since these types of strength members may be elongated by a force less than the force required to break the glase fiber, the strength members 5 are stretched prior to their use. An adhesive coating 8 is placed on the top side of laminant 4 for adhering the stretched strength members to the laminant, and also for holding the strength members in their pre-stretched position.

Figure 2:
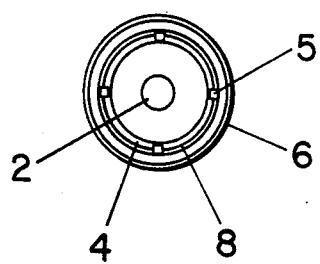
FIG. 2 is a sectional end view of the fiber optic cable shown in FIG. 1.

As can be seen from FIG. 2, the strength members 5 are placed symetrically about the cable core by wrapping the laminant 4 thereabout and the restraining forces applied by the strength members are relatively even about the core to prevent bending of the fiber. The relationship between the laminant 4, the strength member 5, and the adhesive coating 8 may be more clearly seen with reference to FIG. 4.

Figure 4:
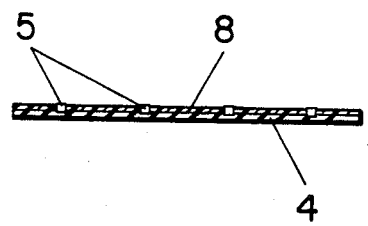
FIG. 4 is a sectional end view of the laminated fiber optic strength members shown in FIG. 3.

FIG. 4 shows an end cross-sectional view of the laminant 4 having the strength members attached thereto prior to it being wrapped about the cable core. As can be seen from FIG. 4, there is provided a thin layer of adhesive 8 in which the strength members 5 are embedded. Adhesive may be any pressure-sensitive or heat-sensitive adhesive such as an epoxy resin of sufficient strength to hold a strength member such as Kevlar in a pre-stretched position of at least from $7 \times 10^6$ pounds per square inch to $19 \times 10^6$ pounds per square inch pressure depending on the break strength of the optical fiber and the desired protection level. A second laminant (not shown) with accompanying adhesive, like laminant 4 and adhesive 8, could be applied to the other side of the strength members without departing from the spirit of the invention.

The cable shown in FIG. 1 may be manufactured in the following manner:

An optical fiber 2 or fiber bundle is provided. Polyvinylchloride protection member 3 may be extruded over the fiber. The force required to break the fiber in its longitudinal direction is measured or calculated. A plurality of Kevlar strength members are stretched so as to apply a force in the opposite direction to the calculated break force of the optical fiber. In the preferred embodiment this stretch force will be approximately equal to the calculated break force of the optical fiber. Normally, the strength members will be stretched to a point where they will elongate less than 1% more.

The stretched strength members are symetrically applied to a tape comprising a laminate with adhesive on one side. The adhesive should be strong enough to hold the strength members in their stretched condition. The strength members may be sandwiched between a pair of such tapes to insure that they are held in their stretched condition.

The laminated strength members are placed around the core containing the optical fiber or fibers. A synthetic resin protective sheath may then be extruded over the laminated strength members.

From the foregoing description of the preferred embodiment of the invention, it would be apparent that many modifications may be made therein. It will be understood, therefore, that this embodiment is intended as an exemplification only and that the invention is not limited thereto. It is to be understood, therefore, that it is intended that the pending claims cover all such modifications that shall fall within the true spirit and scope of the invention.

What is claimed is:

1. A fiber optic cable comprising:
    a fiber optic core including at least one optical fiber adapted to receive optical communication signals;
    at least one elastic strength member substantially straight and parallel to said fiber optic core; said strength member being in a stretched condition;
    means for maintaining said strength member substantially straight and in a stretched condition whereby said strength member is adapted to apply a force in the opposite direction to longitudinal stress forces on said cable for protecting said optical fiber from longitudinal stress.

2. A cable as set forth in claim 1 further including a plurality of elastic strength members parallel to said fiber optic core.

3. A cable as set forth in claim 2 wherein said plurality of elastic strength members are adhered to and supported by at least one laminant, said laminant including an adhesive on one side thereof for holding said elastic strength members in said stretched condition.

4. A cable as set forth in claim 3 wherein said plurality of elastic strength members are substantially evenly spaced from one another.

5. A cable as set forth in claim 1 wherein said means for maintaining includes at least one laminant and an adhesive on one side of said laminant; at least one elastic strength member being secured to said laminant by said adhesive.

6. A cable as set forth in claim 1 wherein said at least one elastic strength member is taken from the group consisting of Kevlar, nylon and polyester.

7. A cable as set forth in claim 1 wherein said at least one elastic strength member has a tensil modulus in the range of $7 \times 10^6$ pounds per square inch to $19 \times 10^6$ pounds per square inch.

8. A cable as set forth in claim 1 wherein said at least one elastic strength member will not substantially elongate under forces equal to the break strength of the fiber optic core.

9. A cable as set forth in claim 1 wherein said at least one strength member is laminated between a pair of tapes.

10. A fiber optic cable comprising:
    a fiber optic core having at least one glass fiber;
    a plurality of strength members, said strength members being substantially straight and having been stretched beyond their normal length; at least one laminant; an adhesive applied to said laminant; said stretched strength members secured to said laminant by said adhesive; said strength members surrounding said fiber optic core;
    a protective sheath surrounding said core and said laminated strength members.

11. A method for providing longitudinal stress protection for a fiber optic cable comprising the steps of:
    providing an optical fiber having a predetermined longitudinal break force; stretching at least one elastic strength member with a force equal to or greater than the break strength force of said optical fiber;
    applying said at least one strength member to a laminant; securing said strength member to said laminant in a straight stretched condition with an adhesive;
    circumscribing said optical fiber with the laminant.

12. The method of making the cable as set forth in claim 11 further including the step of extruding a sheath over said laminant.

* * * * *